United States Patent
Kremer

(10) Patent No.: US 11,161,305 B2
(45) Date of Patent: Nov. 2, 2021

(54) PLANT COMPRISING AT LEAST ONE APPARATUS FOR ADDITIVELY MANUFACTURING THREE-DIMENSIONAL OBJECTS

(71) Applicant: CONCEPT LASER GMBH, Lichtenfels (DE)

(72) Inventor: Viktor Kremer, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 16/274,149

(22) Filed: Feb. 12, 2019

(65) Prior Publication Data
US 2019/0299532 A1 Oct. 3, 2019

(30) Foreign Application Priority Data
Mar. 28, 2018 (EP) .................................... 18164761

(51) Int. Cl.
*B29C 64/379* (2017.01)
*B29C 64/153* (2017.01)
(Continued)

(52) U.S. Cl.
CPC .......... *B29C 64/379* (2017.08); *B29C 64/153* (2017.08); *B29C 64/20* (2017.08);
(Continued)

(58) Field of Classification Search
CPC ... B29C 64/379; B29C 64/259; B29C 64/153; B29C 64/20; B22F 3/1055;
(Continued)

(56) References Cited

U.S. PATENT DOCUMENTS 8,888,480 B2 * 11/2014 Yoo ........................ B33Y 10/00
425/375
9,517,591 B2 * 12/2016 Yoo ........................ B33Y 50/02
(Continued)

FOREIGN PATENT DOCUMENTS

CN  103635305 A   3/2014
DE  102009036153 A1  2/2011
(Continued)

OTHER PUBLICATIONS

European Search Report Corresponding to Application No. 18164761 dated Sep. 19, 2018.
(Continued)

*Primary Examiner* — Nahida Sultana
(74) *Attorney, Agent, or Firm* — Dority & Manning, P.A.

(57) ABSTRACT

Plant (1) comprising at least one apparatus (2, 3, 17, 18) for additively manufacturing three-dimensional objects by means of successive layerwise selective irradiation and consolidation of layers of a build material which can be consolidated by means of an energy source, which plant (1) comprises at least one module (4) separably connected or connectable with the apparatus (2, 3, 17, 18), wherein the plant (1) comprises at least one tunnel structure (5) through which the at least one module (4) is moveable in a tunnel transport direction (6), wherein the at least one module (4) is moveable from the tunnel structure (5) into a work position (7) inside the apparatus (2, 3, 17, 18) along a loading direction (10) and the at least one module (4) is moveable from the work position (7) out of the apparatus (2, 3, 17, 18) along an unloading direction (12).

20 Claims, 4 Drawing Sheets

(51) Int. Cl.
  *B29C 64/20* (2017.01)
  *B29C 64/259* (2017.01)
  *B33Y 10/00* (2015.01)
  *B33Y 30/00* (2015.01)
  *B33Y 40/00* (2020.01)
  *B22F 12/00* (2021.01)
  *B22F 10/10* (2021.01)

(52) U.S. Cl.
  CPC ............ *B29C 64/259* (2017.08); *B22F 10/10* (2021.01); *B22F 12/00* (2021.01); *B33Y 10/00* (2014.12); *B33Y 30/00* (2014.12); *B33Y 40/00* (2014.12)

(58) Field of Classification Search
  CPC . B22F 2003/1056; B33Y 10/00; B33Y 30/00; B33Y 40/00; B28B 1/001
  See application file for complete search history.

(56) References Cited

U.S. PATENT DOCUMENTS

| | | | | |
|---|---|---|---|---|
| 10,618,742 | B2 | 4/2020 | Wahrén | |
| 2003/0001332 | A1* | 1/2003 | Eugster | B65H 29/005 |
| | | | | 271/204 |
| 2006/0099287 | A1* | 5/2006 | Kim | B33Y 30/00 |
| | | | | 425/174.4 |
| 2010/0247742 | A1* | 9/2010 | Shi | B33Y 40/00 |
| | | | | 427/8 |
| 2014/0065194 | A1* | 3/2014 | Yoo | B29C 64/165 |
| | | | | 424/400 |
| 2018/0056393 | A1* | 3/2018 | Herzog | B33Y 50/02 |
| 2018/0185963 | A1* | 7/2018 | Ostroverkhov | B28B 1/001 |
| 2018/0236504 | A1* | 8/2018 | Pourcher | B29C 64/35 |
| 2018/0264552 | A1* | 9/2018 | Herzog | B23K 26/34 |
| 2019/0009334 | A1 | 1/2019 | Effernelli et al. | |
| 2019/0054686 | A1* | 2/2019 | Herzog | B33Y 40/00 |
| 2019/0126559 | A1* | 5/2019 | Herzog | B29C 64/393 |
| 2020/0338817 | A1* | 10/2020 | Murciego Rodriguez | |
| | | | | B29C 64/205 |

FOREIGN PATENT DOCUMENTS

| | | |
|---|---|---|
| EP | 3214024 A1 | 9/2017 |
| JP | 2018/040054 A | 3/2018 |
| WO | 2012128705 A1 | 9/2012 |
| WO | 2017109395 A1 | 6/2017 |
| WO | WO2017/109394 A1 | 6/2017 |

OTHER PUBLICATIONS

Machine Translated Japanese Search Report Corresponding to Application No. 2019026310 dated Jan. 16, 2020.
Machine Translated Japanese Office Action Corresponding to Application No. 2019026310 dated Feb. 13, 2020.
Chinese Search Report Corresponding to Application No. 201910131803 dated Oct. 28, 2020.

* cited by examiner

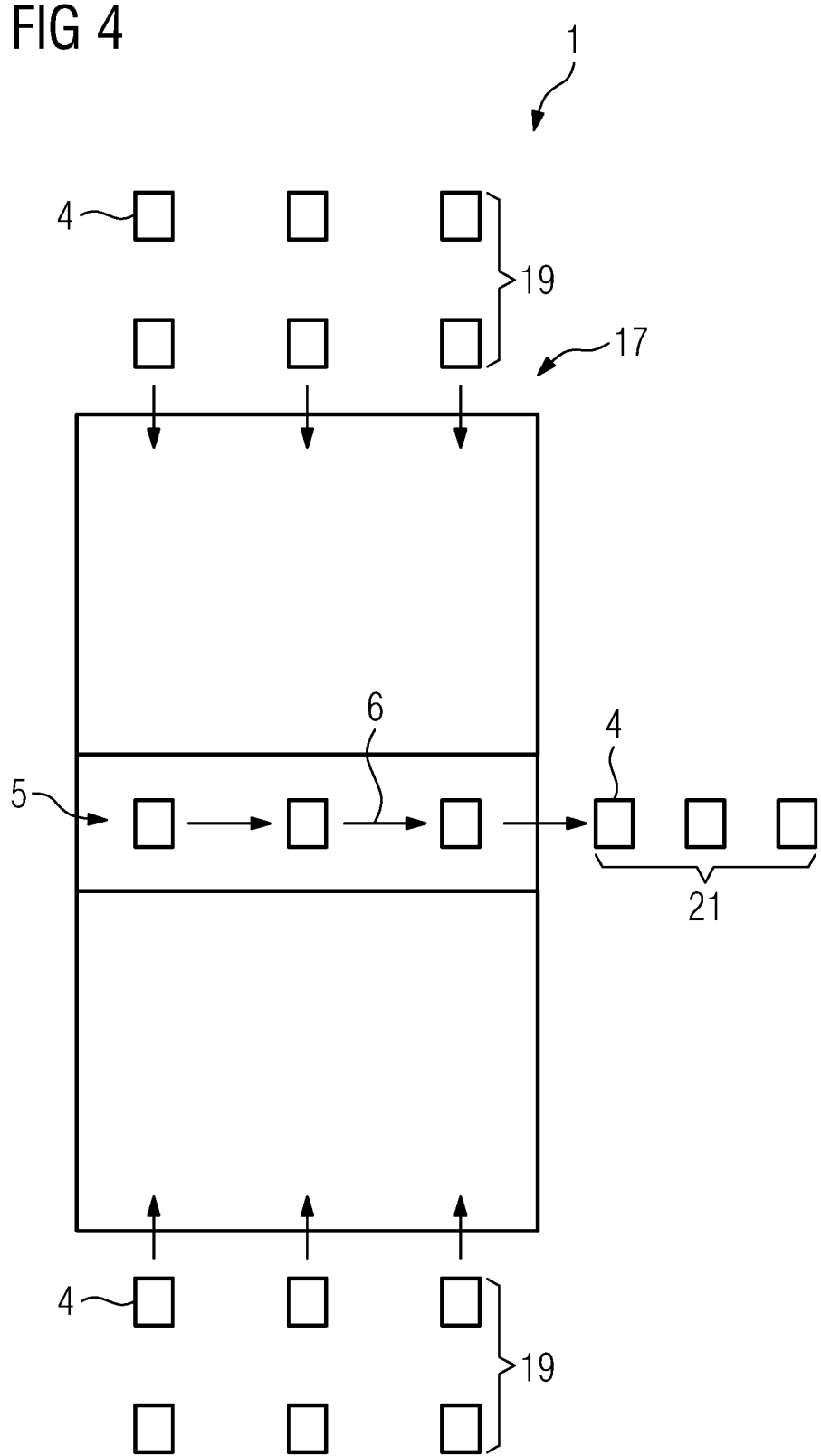

PLANT COMPRISING AT LEAST ONE APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 164 761.1 filed Mar. 28, 2018, the contents of which is incorporated herein by reference in its entirety as if set forth verbatim.

The invention relates to a plant, comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus, wherein the plant comprises at least one tunnel structure through which the at least one module is moveable in a tunnel transport direction.

Plants comprising one or more apparatuses for additively manufacturing of three-dimensional objects are generally known from prior art. For example, at least one apparatus may be provided that is adapted to selectively irradiate layers of a build material to consolidate the build material to form the three-dimensional object. To fulfill certain tasks in the additive manufacturing process the plant comprises at least one module, such as providing fresh build material or a build chamber in which non-consolidated build material and the object to be additively built can be arranged, or providing an overflow chamber in which excess build material can be received, for instance.

Said module is movable through at least one tunnel structure of the at least one apparatus in a tunnel transport direction. The tunnel structure may be considered as being part of the apparatus or part of the plant, wherein it is not necessary that the tunnel structure entirely houses the path the module is moved along being moved along the tunnel transport direction. Of course, it is possible that the tunnel structure provides a complete enclosure that separates the inside of the tunnel structure from the outside, in particular provide an enclosure of the atmosphere inside the tunnel structure. Thus, it is possible to move the modules inside an inert atmosphere protected from the outside, for example sealed from ambient air.

As described before, the modules can be moved into and inside the apparatus via the tunnel structure in tunnel transport direction. The module can be separably connected to the apparatus or separably connected with the apparatus, respectively, in that the additive manufacturing process can be performed, wherein the respective module may perform the assigned task.

Typically, a module that is being connected to the apparatus is moved from the tunnel structure into a module position, e.g. a "work position" in which the module is or may be connected with the apparatus, for example to provide fresh build material to the additive manufacturing process. If the additive manufacturing process is finished or if the respective module needs to be changed, e.g. if the dose chamber of the dose module is empty or the overflow chamber of an overflow module is full, the module is disconnected from the apparatus and moved back into the tunnel structure to be removed from the apparatus. As the path on which the module is moved into the work position and out of the work position is the same, the path has to be kept free for the module to be removed from the apparatus.

Thus, it is not possible to have a fresh module brought to the work position, until the used module is removed from the work position and has been moved along the loading/unloading path. This leads to a downtime of the additive manufacturing apparatus, as no fresh module can be connected until the used module is entirely removed or at least is removed from the loading/unloading path.

It is an object of the present invention to provide a plant comprising at least one apparatus for additively manufacturing three-dimensional objects, wherein additive manufacturing processes may be performed more efficiently, in particular wherein downtimes of the at least one apparatus may be reduced.

The object is inventively achieved by a plant according to claim 1. Advantageous embodiments of the invention are subject to the dependent claims.

The plant described herein comprises at least one apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electronic beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, as described before, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a plant with at least one apparatus for additively manufacturing three-dimensional objects, wherein at least one module is provided that is movable in a tunnel transport direction through a tunnel structure. The invention is based on the idea that the at least one module is movable from the tunnel structure into a work position inside the apparatus along a loading direction and the at least one module is movable from the work position out of the apparatus along an unloading direction or the at least one module is movable from outside the apparatus into the work position along a loading direction and the at least one module is movable from the work position into the tunnel structure along an unloading direction, wherein the loading and unloading direction differ from the tunnel transport direction.

Thus, it is possible that the at least one module is moved from the tunnel structure into the work position (along a loading direction) and out of the apparatus (along an unloading direction) or it is possible to move the at least one module into the work position along the loading direction and out of the work position along an unloading direction (into the tunnel structure) and out of the apparatus along the tunnel transport direction, wherein both the loading direction and the unloading direction differ from the tunnel transport direction.

In other words, according to the first of the two alternatives, it is possible to insert the at least one module into the tunnel structure along the tunnel transport direction and move the module towards the work position the at least one module is to be used in the additive manufacturing process. The module can be moved from the tunnel structure into the work position along the loading direction differing from the tunnel transport direction. Thus, the module is moved inside the tunnel structure towards a position in the tunnel structure from which it can be moved along loading direction into the work position. In the work position the at least one module can separably be connected to the apparatus to perform the assigned task in the additive manufacturing process, for instance. After the additive manufacturing process is finished or if the module has to be changed, the module can be detached or disconnected from the apparatus. The use module can then be moved from the work position out of the apparatus along an unloading direction.

Alternatively, it is possible to move the module (from the outside) into the apparatus along a loading direction, wherein the module is moved (from outside the apparatus) into the work position. Again, the at least one module may be connected with or attached to the at least one apparatus in the work position, wherein the additive manufacturing process can be performed with the at least one module in the work position. After the additive manufacturing process is finished or if the at least one module needs to be changed, it is possible to disconnect or separate the at least one module from the at least one apparatus. Afterwards, the at least one module may be moved from the work position into the tunnel structure (along the unloading direction) and can be removed from the apparatus through the tunnel structure along the tunnel transport direction.

In both alternatives described before, the loading direction and the unloading direction differ or deviate from the tunnel transport direction. Therefore, the unloading path (extending in unloading direction) and the loading path (extending in loading direction) differ, resulting in that a module is brought to the work position on a loading path that differs from an unloading path along which the at least one module is removed from the work position and removed from the at least one apparatus afterwards. Thus, it is possible to move a fresh module towards the work position along the loading path before the module that is currently in use is detached from the apparatus and removed from the work position. After the module that was currently in use has been detached and removed from the work position the next module can continuously be moved into the work position, as the used module is removed from the at least one apparatus along the unloading path that differs from the loading path along which the fresh module is being brought into the work position. Hence, the efficiency in performing the additive manufacturing process can significantly be increased, in particular downtimes can be significantly reduced, since there is no need for keeping the loading path free for the used module to be removed from the at least one apparatus, in particular from the work position.

Preferably, the loading direction and the unloading direction are aligned under a defined angle, preferably the loading and unloading direction are oriented in the same direction.

Thus, a particularly preferred defined angle that is enclosed between the loading direction and the unloading direction is about 0° or 180°, respectively, allowing for the at least one module being moved on a straight path along the loading direction and the unloading direction. In other words, the loading direction and the unloading direction or the loading path and the unloading path, respectively, are connected in the work position. The at least one module may be moved on the loading path that extends along loading direction into the work position and afterwards the at least one module may be moved from the work position on the unloading path that extends along the unloading direction. Thus, as the at least one module is removed from the work position following another path (namely the unloading path) as the path along which the module has been brought into the work position (namely the loading path) it is not necessary to keep the loading path free for the used module for being removed from the work position, but it is possible to have the next fresh module being brought towards the work position on the loading path before the used module is removed from the work position via the unloading path.

Thus, it is possible to have a unidirectional module flow or a unidirectional material flow, as the module is not required to take the same way back from the work position to be removed from the apparatus as it was moved along into the work position.

The work position may correspond to the type of module or each type of module is suitable to be moved in a corresponding work position. For example, dose modules, build modules and overflow modules can be provided, wherein the work position for each type of module differs from the other work positions. In particular, a work position for a dose module may be deemed dose position, the work position for the build module may be deemed build position and the work position for the overflow module may be deemed overflow position, for instance.

As also described before, the at least one apparatus may comprise two different work positions for each type of module (optional), e.g. two dose positions, two build positions and two overflow positions, for instance.

Additionally or alternatively it is also possible that at least one apparatus comprises at least one buffer position, in which at least one module can be positioned in advance to an additive manufacturing process, wherein at least one module is movable along a buffer direction from the tunnel structure into the buffer position and is movable from the buffer position into a corresponding work position along an unbuffer direction, in particular along a loading direction. Thus, it is possible that the apparatus comprises at least one buffer position in which the module may be arranged, for example in advance to an additive manufacturing process. The module being arranged in the buffer position may be stored or buffered, respectively, until the module that is currently used and arranged in the work position is separated from the apparatus, for example if the additive manufacturing process is finished or the used module is to be replaced with the module being arranged in the buffer position. After the used module has been removed from the work position, the module arranged in the buffer position can be moved in unbuffer direction, which preferably extends in loading direction, in that the module can be loaded into the now vacant work position.

Thus, if the work position for the corresponding type of module becomes vacant, it is possible to move the fresh module already "waiting" in the buffer position into the work position. Thus, downtimes of the apparatus can significantly be reduced, as the next module that is required to be moved into the work position is already waiting in the buffer position and can therefore, instantly be used after the used module has been removed from the work position. For example, the buffer position and the work position may be arranged in different positions on different sides of the tunnel structure. In other words, it is possible to move a module from the tunnel structure into the work position or into the buffer position, wherein the buffer direction and the loading direction are arranged in different, in particular opposite, directions. If the used module has to be removed from the work position, the module is moved in unloading direction, e.g. from the work position into the tunnel structure or out of the apparatus.

Another module that has been moved along the buffer direction from the tunnel structure into the buffer position can then be moved from the buffer position in unbuffer direction into the tunnel structure and in loading direction into the work position the used module has been removed from. Of course, it is also possible to move the fresh module from the buffer position directly into the work position along the unbuffer direction/loading direction. Of course, the next fresh module can then be entered into the buffer position from the tunnel structure along buffer direction to "refill" the buffer position that become vacant due to the movement of the fresh module that was stored in the buffer position into the work position.

Preferably, a module being moved from the buffer position into the work position may be moved across the tunnel structure. Although, it is possible to arrange the tunnel structure in another way, for example in that a module can be moved from the tunnel structure through the buffer position into the work position it is preferred that the tunnel structure extends between the buffer position and the work position. For example, a module that is arranged in the buffer position is moved in unbuffer direction into the tunnel structure and can then be moved in the loading direction from the tunnel structure into the work position. Thus, it is advantageously possible to move the modules between the buffer position and the work position, as both, the work position and the buffer position are accessible at any time. In other words, a module may be removed from the work position without moving a module waiting in the buffer position and, vice versa, a module may be moved into the buffer position or out of the buffer position without interfering with a module being arranged in the work position.

According to another preferred embodiment of the inventive plant, the at least one apparatus may comprise three buffer positions, wherein the three buffer positions correspond to three work positions and wherein the three different types of modules can be arranged in the buffer positions. As mentioned before, it is possible to provide different types of modules that can be used to perform different tasks in the additive manufacturing process, such as dose modules, build modules and overflow modules. The three different types of modules may therefore, form a "triplet" that can be used simultaneously or in can be used in parallel in the same additive manufacturing process. For example, the dose module may provide the build material to a build module, in which the build material may be arranged in the build plane and selectively irradiated and consolidated to form the three-dimensional object. Excess build material from the application process step can be moved/conveyed to the overflow module in which it can be received in a corresponding overflow chamber.

After the additive manufacturing process is finished, the three modules can simultaneously be separated from the apparatus and moved from the corresponding work positions along the unloading direction and removed from the apparatus. Self-evidently, it is also possible to individually change the module as needed, for example, the overflow module is only changed, if a fill level of excess build material inside the overflow chamber reaches a predefined fill level or the dose module is only changed, if the fill level of fresh build material inside the dose chamber reaches a predefined fill level, in particular if the dose chamber is empty or the overflow chamber is full, for instance. For each of the work positions (dose position, build position, overflow position) corresponding buffer positions may be provided in that each apparatus, for example, comprises three buffer positions and three corresponding work positions. Of course, it is also possible that at least one apparatus for additively manufacturing of three-dimensional objects comprises more or less than three work positions and/or more or less than three buffer positions.

According to another embodiment of the inventive plant, at least one apparatus may comprise at least two work positions arranged on opposite sides of the tunnel structure, in particular three different types of work positions for the three different types of modules arranged on both sides of the tunnel structure. Thus, it is possible that each "module position" as described before, represents or is built as a work position (for the corresponding type of module). Thus, at least one module may be moved from the tunnel structure in either one of at least two work positions that are arranged on opposite sides of the tunnel structure. For example at least one apparatus may comprise at least two work positions that are arranged on opposite sides of the tunnel structure or multiple work positions, such as described before, three work positions for three different types of modules that are arranged on opposite sides of the tunnel structure.

Preferably, the at least one apparatus comprises a dose position, a build position and an overflow position on each side of the tunnel structure. In other words a dose module, build module and an overflow module may be moved from the tunnel structure into the corresponding dose position, build position and overflow position, wherein a triplet of work positions is arranged on every side of the tunnel structure. In other words, a module may be moved from the tunnel structure into one of two (identical) work positions, wherein the (identical) work positions are arranged on opposite sides of the tunnel structure. Thus, the module may be moved, for example, from the tunnel structure "to the left" into the work position or "to the right" into a corresponding work position. Thus, it is possible to perform two additive manufacturing processes simultaneously or in parallel on the at least two work positions arranged on opposite sides of the tunnel structure.

Of course, the at least one module being positioned in one of the at least two work positions can also be removed from the work position along the unloading direction following the unloading path and can be moved into one of the at least two work positions along the loading direction following the loading path. In other words, the at least one module may be moved along the tunnel transport direction through the tunnel structure towards the at least two work positions. The at least one module may be moved from the tunnel structure in loading direction into one of the at least two work positions and afterwards the at least one module may be moved from the work position (and removed from the apparatus) along the unloading direction.

The inventive plant may further be improved in that at least one module is moveable into the apparatus via the tunnel structure and out of the apparatus through an opening in the apparatus or at least one module is moveable into the apparatus through an opening in the apparatus and out of the apparatus via the tunnel structure. Thus, it is possible to insert at least one module into the at least one apparatus via an opening in the apparatus that is not arranged in the tunnel structure or to remove at least one module from at least one apparatus of the plant via the opening. Hence, it is possible to insert a module via the tunnel structure into the work position and move the module out of the apparatus from the work position through the opening. Analogously, it is possible to insert at least one module along the loading path through the opening into the apparatus into the work position and remove the at least one module from the work position along the unloading path into the tunnel structure and through the tunnel structure out of the apparatus. The at least one opening may comprise suitable means to be closed, in particular to be sealed from the outside, to ensure that an inert atmosphere that is inside the tunnel structure and/or inside the apparatus can be maintained, e.g. via an airlock.

Preferably, the plant may be adapted to individually load modules into the tunnel structure dependent on at least one vacancy parameter relating to the type of the module and/or a type of at least one vacant work position and/or a type of at least one vacant buffer position. Thus, it is possible that the plant monitors or determines, whether at least one module position, i.e. a work position and/or a buffer position, inside at least one apparatus for additively manufacturing three-dimensional objects, is vacant or becomes vacant. Dependent on whether a module position is or becomes vacant, it is possible to individually load a corresponding module into the tunnel structure that can be moved along the tunnel transport direction towards the vacant module position and can be loaded into the vacant module position along the loading direction or the buffer direction, respectively. The plant may therefore, comprise the means for determining whether a module position is occupied or is vacant or becomes vacant, e.g. via a corresponding control unit and suitable detection means.

Further, it is possible that the plant may be adapted to load the tunnel structure with at least two modules in a predefined order, preferably dependent on at least one process parameter. Hence, at least two modules may be loaded into the tunnel structure in a predefined order, in particular a sequence defining the order the at least two modules are used or required in the additive manufacturing process. The predefined order may be defined dependent on at least one process parameter, for example a required amount of build material or at least one process status of an additive manufacturing process performed in the at least one apparatus. For example, if it is detected that an additive manufacturing process is finished or is about to be finished in the near future, the corresponding modules that are needed for the replacement of the modules that are or will be removed from the corresponding apparatus, can be loaded into the tunnel structure in the right order.

According to another embodiment of the inventive plant, the plant comprises a plurality of apparatuses, wherein the tunnel structures of at least two apparatuses are connected to each other. Thus, the at least two apparatuses may be deemed as connected in in series, wherein the tunnel structures of the at least two apparatuses are connected together. Thus, a module being moved into the tunnel structure may be moved to any of the at least two apparatuses that are connected via their tunnel structures. Therefore, one end of the tunnel structure may be deemed as "entrance" and the opposing end of the tunnel structure may be deemed as "exit" for the modules, wherein modules that are to be used in an additive manufacturing process can be moved into the tunnel structure via the entrance and be moved to the corresponding buffer position or work position into one of the at least two apparatuses. If at least one module has been used that can be moved from the corresponding work position back into the tunnel structure and removed from the corresponding apparatus via the exit of the tunnel structure. Thus, the tunnel transport direction extends from the entrance to the exit of the tunnel structure, wherein the tunnel transport direction is preferably the same for every module.

The inventive plant can further be improved in that at least one first buffer region may be arranged in advance to the tunnel structure of the at least one apparatus and/or at least one second buffer region may be arranged behind the tunnel structure of the at least one apparatus with respect to the tunnel transport direction or at least one first buffer region is arranged in advance to the at least one apparatus and at least one second buffer region is arranged behind the tunnel structure with respect to the loading direction.

Thus, the buffer positions, as described before, being arranged inside the at least one apparatus may also be deemed as "inner buffer positions", whereas the first and second buffer region may be arranged outside the apparatus or in the tunnel structure, in particular in advance to the apparatus, in advance to the tunnel structure, in the tunnel structure or behind the tunnel structure, respectively. Thus, the tunnel structure may extend beyond the at least one apparatus in advance to the entrance of the tunnel structure and beyond the exit of the tunnel structure providing a first buffer region in advance to the tunnel structure and/or a second buffer region extending behind the exit of the last tunnel structure of the last of the at least two apparatuses that are connected via their tunnel structures. It is also possible that a first buffer region is arranged in advance to the apparatus, for example a first buffer region is adapted to store at least one module before it is being transferred along the loading path into the at least one apparatus. It is also possible that a second buffer region is arranged in the tunnel structure, wherein a module being removed from the work position along the unloading path into the tunnel structure can be stored in the second buffer region.

Hence, it is possible that at least one module may be stored in the first buffer region before it is inserted into the tunnel structure (via the entrance of the corresponding tunnel structure) of the corresponding apparatus for additively manufacturing of three-dimensional objects, for example, after being pre-processed via a corresponding pre-processing station, e.g. a refill station. It is also possible that at least one module that has been removed from one of the apparatuses via the exit of the tunnel structure is stored in the at least one second buffer region, for example, before being post-processed in a post-processing station, e.g. a handling station. Additionally or alternatively, it is possible to manipulate, e.g. pre-process or post-process a module, in particular each module, while it is staged in the (first) buffer region.

The modules may be moved in the tunnel structure via at least one transport unit, in particular a linear transport unit, preferably a conveyor. Thus, the module may only be passively moved via an external transport unit, for example the modules may be placed on the transport unit and be moved via the transport unit through the tunnel structure. It is possible that the transport unit comprises means for moving the at least one module from the tunnel structure into the module positions and from the module positions back into the tunnel structure from where it can be moved along the tunnel transport direction through the at least one apparatus.

Additionally or alternatively, it is also possible that at least one mobile transport unit (for example integrated into the module) is provided that is adapted to transfer at least one module to the tunnel structure or the first buffer region and/or to receive at least one module from the tunnel structure or from the second buffer region. It is also possible that the at least one module is entirely automated, for example an automated vehicle, and is individually movable, preferably due to an individual motor integrated in each module.

According to another embodiment of the inventive plant, at least one mobile transfer unit may be adapted to transfer the at least one module between a pre-processing station and the tunnel structure or the first buffer region and/or between the tunnel structure or the second buffer region and a post-processing station. As described before, the mobile transfer unit may be deemed as being external to the module and receiving the module for moving the module or the mobile transfer unit may be deemed as being integrated into the module. Thus, it is possible that the mobile transfer unit moves the at least one module outside the at least one apparatus providing the at least one module to the first buffer region or the tunnel structure or receiving the at least one module from the tunnel structure or the second buffer region. It is particularly possible that the at least one mobile transfer unit moves the at least one module between the pre-processing station and the tunnel structure or the first buffer region or between second buffer region or the tunnel structure and a post-processing station. Additionally or alternatively, it is possible to manipulate, e.g. pre-process or post-process a module, in particular each module, while it is staged in the (second) buffer region.

Further, at least one module may be arranged or arrangeable in a buffer position inside the tunnel structure. Hence, the tunnel structure itself may be used as a buffer position or provide at least one buffer position for the at least one module. In particular, the tunnel structure may be loaded with modules in the predefined order, as due to the unidirectional material flow or module flow, the tunnel structure does not have to be kept free.

Besides, the invention relates to an apparatus for additively manufacturing three-dimensional objects by means of successive layerwise selective irradiation and consolidation of layers of a build material which can be consolidated by means of an energy source, in particular an apparatus for an inventive plant, as described before, wherein at least one module is separably connected or connectable with the apparatus, wherein the apparatus comprises at least one tunnel structure through which the at least one module is moveable in a tunnel transport direction, wherein the apparatus comprises at least one work position for the at least one module, wherein the at least one module is moveable from the tunnel structure into the work position along a loading direction and the at least one module is moveable from the work position out of the apparatus along an unloading direction or the at least one module is moveable from outside the apparatus into the work position along a loading direction and the at least one module is moveable from the work position into the tunnel structure along an unloading direction, wherein the loading and unloading direction differ from the tunnel transport direction.

Further, the invention relates to a method for moving at least one module in a plant, in particular an inventive plant, as described before, comprising at least one apparatus for additively manufacturing three-dimensional objects by means of successive layerwise selective irradiation and consolidation of layers of a build material which can be consolidated by means of an energy source, which plant comprises at least one module separably connected or connectable with the apparatus, wherein the plant comprises at least one tunnel structure through which the at least one module is moveable or is moved in a tunnel transport direction, wherein the apparatus comprises at least one work position for the at least one module, wherein the at least one module is moved from the tunnel structure into the work position along a loading direction and the at least one module is moved from the work position out of the apparatus along an unloading direction or the at least one module is moved from outside the apparatus into the work position along a loading direction and the at least one module is moved from the work position into the tunnel structure along an unloading direction, wherein the loading and unloading direction differ from the tunnel transport direction.

Self-evidently, all details, features and advantages described with respect to the inventive plant are fully transferable to the inventive apparatus and the inventive method. Preferably, the inventive method may be performed on the inventive plant, e.g. using at least one inventive apparatus.

Exemplary embodiments of the invention are described with reference to the FIG. The FIG. are schematic diagrams, wherein FIG. 1 shows an inventive plant according to a first embodiment;

FIG. 4 shows an inventive plant according to a fourth embodiment.

Figure 1:
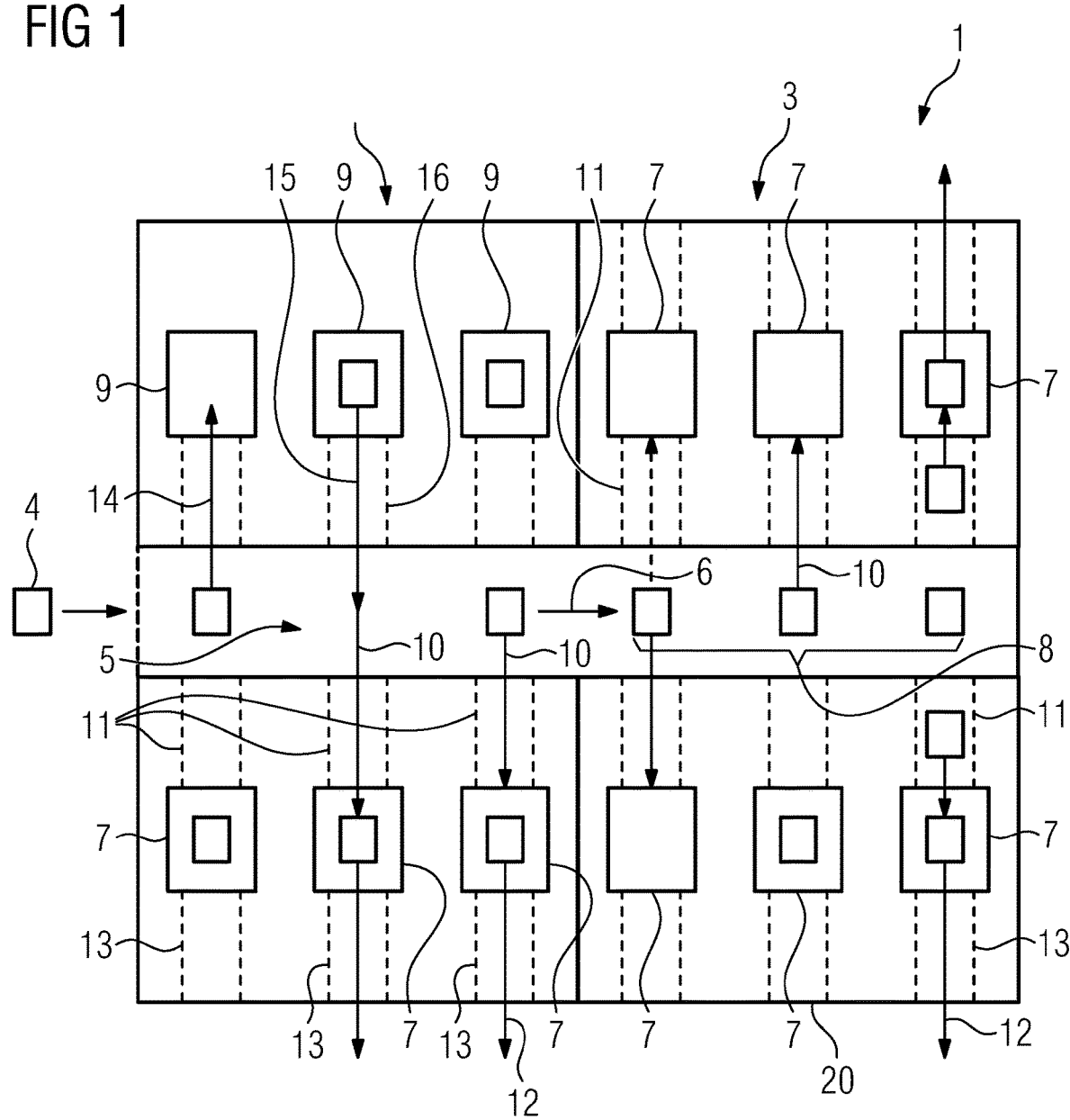

FIG. 1 shows a plant 1 comprising two apparatuses 2, 3 for additively manufacturing three-dimensional objects by means of successive layerwise selective irradiation and consolidation of layers of a build material which can be consolidated by means of an energy source, such as a laser beam or an electron beam. According to this exemplary embodiment two apparatuses 2, 3 are provided, wherein it has to be understood that an arbitrary number of apparatuses 2, 3 may be provided or comprised in the plant 1.

The plant 1 further comprises a plurality of modules 4 that can separably be connected with the apparatus 2, 3. The modules 4 may be moved through a tunnel structure 5 that extends through the apparatuses 2, 3, wherein the modules 4 may be moved through the tunnel structure 5 in a tunnel transport direction 6. The tunnel structure 5 extends through the apparatuses 2, 3, wherein the apparatuses 2, 3 can be deemed as being connected via the tunnel structure 5. For example, an exit of the tunnel structure 5 of the apparatus 2 may be connected to an entrance of the tunnel structure 5 of the apparatus 3.

Of course, a plurality of apparatuses 2, 3 may be connected via the tunnel structure 5, in particular in arbitrary combination. The situation depicted in FIG. 1 is merely exemplary, wherein an arbitrary configuration of apparatuses 2, 3 and combination of arbitrarily configured apparatuses 2, 3 is feasible to form the plant 1.

The modules 4 in the situation that is depicted in FIG. 1, can be moved into the tunnel structure 5 from where it is possible to move the modules 4 to a work position 7. Although, the apparatuses 2, 3 are depicted comprising multiple work positions 7, it is also possible that each apparatus 2, 3 only comprises one work position 7 or any arbitrary number of work positions 7. The work positions 7 may be assigned to different types of modules 4, such as dose modules, build modules and overflow modules, for instance. Such dose modules may be used to provide fresh build material in the additive manufacturing process, wherein build modules provide a build chamber in which a powder bed of non-consolidated build material can be received in which the three-dimensional object can be built. Excess build material that is conveyed from the dose module to the build module and cannot be received within the build chamber can be depleted in an overflow chamber of the overflow module. Hence, it is possible that three modules 4 form a triplet 8 that can simultaneously be used in an additive manufacturing process. For example, three modules 4, wherein a dose module, a build module and an overflow module is provided, can be used in the same additive manufacturing process and can therefore, be moved as triplet 8 into the corresponding work positions 7.

The apparatus 2 of the inventive plant 1, according to the first exemplary embodiment that is depicted in FIG. 1, comprises three work positions 7 and three buffer positions 9. The modules 4 may be moved from the tunnel structure 5 into a work position 7 inside the apparatus 2 along a loading direction 10. Thus, loading paths 11 are provided for moving the modules 4 from the tunnel structure 5 into the work positions 7, wherein the loading paths 11 extend along the loading direction 10. After the additive manufacturing process is finished or if a module 4 or a triplet 8 of modules 4 has to be removed from the work position 7, the corresponding modules 4 can be detached from the apparatus 2 and can be moved along an unloading direction 12, i.e. following an unloading path 13. Thus, the module being moved along the unloading path 13 that extends along the unloading direction 12 can be moved from the work position 7 out of the apparatus 2.

The apparatus 2 further comprises buffer positions 9, as described before, wherein a corresponding module 4 may be moved along a buffer direction 14 into the corresponding buffer position 9. In other words, the buffer position 9 may be assigned to the corresponding type of module 4 or it is possible to have buffer positions 9 in which an arbitrary type of module 4 may be stored in advance to an additive manufacturing process. If one of the work positions 7, in particular a corresponding work positions 7 that corresponds to the type of module 4 that is stored in the assigned buffer position 9, becomes vacant, as the module 4 being arranged in the work position 7 is removed from the work position 7 along the unloading path 13, the corresponding module 4 stored in the buffer position 9 may be moved along an unbuffer direction 15 following a buffer/unbuffer path 16 back into the tunnel structure 5 and along the loading direction 10 into the work position 7.

Hence, if one of the buffer positions 9 or one of the work positions 7 becomes vacant, the plant 1 (e.g. via a control unit of the plant 1) is adapted to individually load a corresponding module 4, in particular matching the type of module that is required to "refill" the vacant work position 7 or buffer position 9. In particular, it is possible to simultaneously load a triplet 8 of corresponding modules 4. For example, if an additive manufacturing process is finished the modules 4 being arranged in the three work positions 7 can be removed from the apparatus 2 via the unloading path 13, wherein fresh modules 4, in particular a triplet 8 of fresh modules 4 may be loaded, either from the buffer positions 9 or from the tunnel structure 5.

Regarding the apparatus 3 it is also possible that no buffer positions 9 are provided, but that three additional (or any other arbitrary number of) work positions 7 are provided. Hence, modules 4 may be moved from the tunnel structure 5 to the corresponding work positions 7 along the loading direction 10 following loading paths 11. In other words, a module 4 being moved into the tunnel structure 5 of the apparatus 3 might either be moved "to the left" or "to the right" (in this exemplary embodiment) along the loading direction 10 that defines the direction of the loading path 11. After the additive manufacturing process is finished or the corresponding module 4 has to be replaced or changed, the module 4 may be removed from the work position 7 along the unloading direction 12 following the unloading path 13, as described before.

As can further be derived from FIG. 1, it is possible to buffer fresh modules 4 on the loading path 11, wherein a fresh module 4 can be already moved on the loading path 11 before the used module 4 that is currently arranged in the work position 7 is removed from the work position 7. As soon as the used module 4 in the work position 7 is detached from the apparatus 3 and is removed from the apparatus 3 via the unloading path 13, the fresh module 4 "waiting" in the loading path 11 can be moved into the work position 7. Hence, the module flow direction or the material flow direction may be deemed as being unidirectional, as no module 4 is moved or removed from the corresponding apparatus 2, 3 on the same path that it was moved into the work position 7. Hence, the loading paths 11 do not have to be kept free for the currently used module 4 to be removed from the apparatus 2, 3. Instead, the plant 1 may already load a corresponding fresh module 4 and move the fresh module 4 via the loading paths 11 towards the work position 7. Thus, downtimes of the apparatus 3 can be significantly reduced. Of course, an arbitrary combination of buffer positions 9 and work position 7 is feasible.

Figure 2:
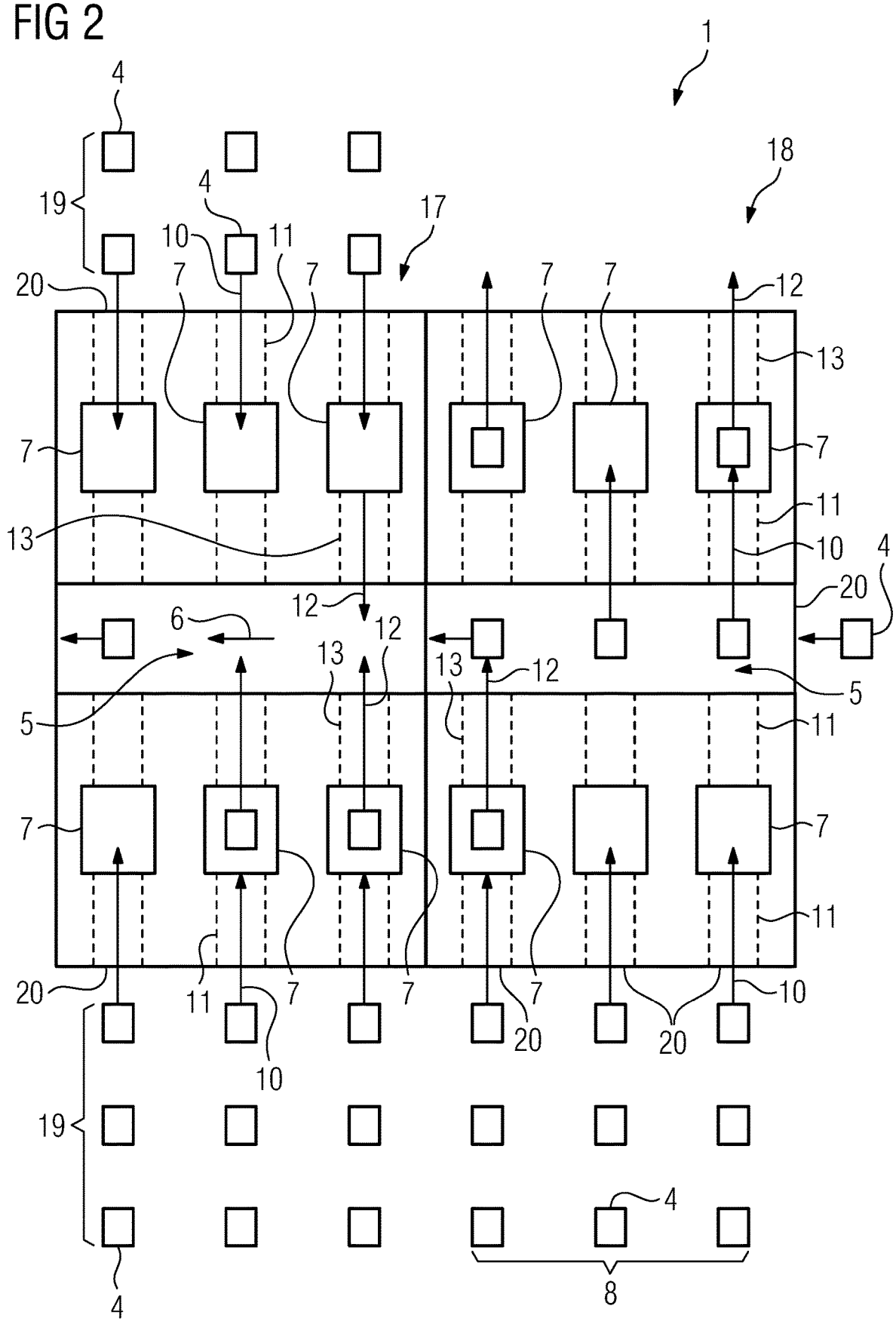
FIG. 2 shows an inventive plant according to a second embodiment.

FIG. 2 shows a plant 1 according to a second exemplary embodiment. The plant 1 comprises two apparatuses 17, 18 that are again connected via a tunnel structure 5. Regarding the apparatus 17 of the plant 1, as depicted in FIG. 2, the material flow or the module flow is also unidirectional, but is oriented in the opposite direction. In other words, modules 4 being arranged in a first buffer region 19 can be moved into the apparatus 17 along the loading direction 10. As already described before, with respect to the apparatus 3, the apparatus 17 comprises six work positions 7, from which two work positions 7 are assigned to the same type of module 4, for example dose modules, build modules and overflow modules.

Further, the apparatus 17 comprises openings 20 through which the modules 4 may be moved into the apparatus 17, in particular in the corresponding work positions 7. Thus, the modules 4 may be moved along the loading paths 11 that extend along the loading direction 10 into the work position 7. After the additive manufacturing process is finished or if the corresponding module 4 needs to be replaced, the module 4 may be moved from the work position 7 along the unloading path 13 that extends in unloading direction 12 into the tunnel structure 5. As the apparatus 17 comprises work position 7 that are arranged on both sides of the tunnel structure 5, it is possible that each module 4 being arranged in a work position 7 is removed from the apparatus 17 by moving the module 4 from the work position 7 along the unloading path 13 into the tunnel structure 5. Subsequently, the modules 4 may be moved along tunnel transport direction 6 and removed from the apparatus 17.

Regarding the apparatus 18, it is possible that modules 4 may be moved from outside the apparatus 18 into the tunnel structure 5 and from the tunnel structure 5 into one of the work positions 7. Hence, a module 4, in particular a fresh module 4, may be inserted into the tunnel structure 5 via an opening 20 and may be moved from the tunnel structure 5 in loading direction 10 or along the loading path 11. From the work position 7 it is possible to move the module 4 on the unloading path 13 that extends in unloading direction 12. It is also possible to move modules 4 being stored in the first buffer region 19 through an opening 20 on a loading path 11 that extends in loading direction 10 into one of the work positions 7.

Again, it is also possible to build triplets 8 of modules 4 that can be loaded into the apparatus 17, 18 as triplets 8 in that the additive manufacturing process can be performed with the triplets 8 of modules 4. From the work positions 7 it is possible to move a module 4 along an unloading direction 12 on an unloading path 13 into the tunnel structure 5 and move the modules 4 from the tunnel structure 5 in tunnel transport direction 6 out of the apparatus 17, 18. Of course, an arbitrary combination of apparatuses 2, 3, 17, 18 is feasible to form a plant 1. The individual aspects, details and features of loading and unloading or buffering and unbuffering modules 4 described with respect to the individual apparatuses 2, 3, 17 and 18 can arbitrarily be transferred, combined and exchanged.

Figure 3:
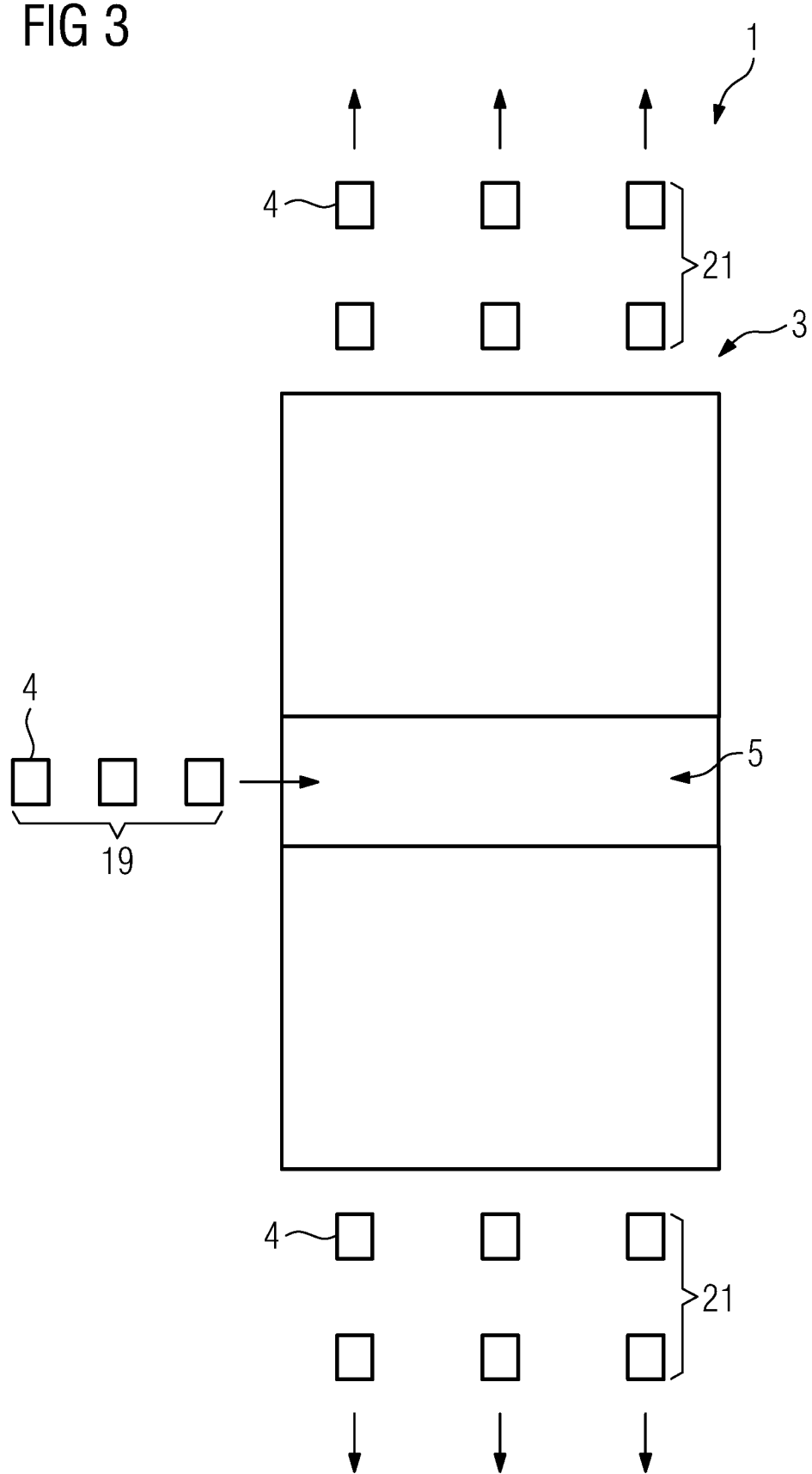
FIG. 3 shows an inventive plant according to a third embodiment.

FIG. 3 shows a plant 1 according to a third embodiment. The plant 1 comprises a first buffer region 19 and two second buffer regions 21. As can be derived from FIG. 3, the exemplary third embodiment shows a plant 1 comprising an apparatus 3 of the type of the apparatus 3, as depicted in FIG. 1. Thus, modules 4 being removed from the apparatus 3 via unloading path 13 and therefore, are moved from the work position 7 to the outside of the apparatus 3 can be stored in the second buffer regions 21. Thus, the modules 4 can be stored in the second buffer regions 21 to be picked up, for example by a transport unit, such as a mobile transport unit, or the modules 4 may themselves contain a mobile transport unit to be able to move, for example to a post-processing station, such as a handling station. It is also possible that in advance to the first buffer region 19, a pre-processing station is provided, e.g. a refill station in which dose modules can be refilled with build material.

FIG. 4 shows a fourth embodiment of a plant 1, wherein the depicted apparatus 17 is generally of the type of the apparatus 17, as depicted in FIG. 2. Thus, two first buffer regions 19 are provided, in which modules 4 may be stored in advance to an additive manufacturing process, in particular in advance to being moved into the apparatus 17, via corresponding loading paths 11 extending in loading direction 10. After the additive manufacturing process is finished or if one of the modules 4 has to be changed or replaced, the respective module 4 may be moved from the work position 7 into the tunnel structure 5, as described before, with respect to the apparatus 17, for instance.

Hence, the modules 4 may be moved through the tunnel structure 5 in tunnel transport direction 6 to be removed from the apparatus 17. Modules 4 that are removed from the apparatus 17 may be stored in a second buffer region 21 for example, in advance to being processed in a post-processing station. Of course, it is also possible to pre-process the modules 4 before they are stored in the first buffer regions 19, for example via a pre-processing station that is built as refill station in which a dose chamber of at least one dose module is refilled with fresh build material, for instance.

Of course, all details, features and advantages that are described with respect to the individual embodiments that are depicted in the FIGS. 1-4 can arbitrarily be combined and all details, features and advantages can arbitrarily be exchanged and transferred between the individual embodiments. Self-evidently, the inventive method may be performed on the inventive plant 1, preferably using at least one or more inventive apparatus, e.g. one or more inventive apparatuses 2, 3, 17, 18.

The invention claimed is:

1. A plant for additive manufacturing, comprising:
   at least one apparatus for additively manufacturing three-dimensional objects by successive layerwise selective irradiation and consolidation of layers of a build material with an energy source, the plant comprising:
   at least one powder module separably connected or connectable with the at least one apparatus, wherein the at least one powder module comprises at least one of a dose module or an overflow module; and
   at least one tunnel structure through which the at least one powder module is moveable in a tunnel transport direction, wherein the at least one powder module is moveable:
      from the at least one tunnel structure into a work position into the at least one apparatus along a loading direction and from the work position out of the at least one apparatus along an unloading direction; or
      from outside the at least one apparatus into the work position along the loading direction and from the work position into the at least one tunnel structure along the unloading direction;
   wherein the loading and unloading direction differ from the tunnel transport direction and wherein the at least one tunnel structure is arranged inside the at least one apparatus.

2. The plant according to claim 1, wherein the loading direction and the unloading direction are aligned under a defined angle.

3. The plant according to claim 2, wherein the loading and unloading direction are oriented in the same direction.

4. The plant according to claim 1, wherein the at least one apparatus comprises at least one buffer position in which the at least one powder module is configured to be positioned in advance to the manufacturing process.

5. The plant according to claim 4, wherein the at least one powder module is moveable along a buffer direction from the at least one tunnel structure into the at least one buffer position and is moveable from the buffer position into a corresponding work position in the loading direction.

6. The plant according to claim 5, wherein the at least one powder module, being moved from the at least one buffer position into the work position, is moveable across the at least one tunnel structure.

7. The plant according to claim 1, wherein the at least one powder module comprises:
   a build module arrangeable in a first buffer position corresponding to a first work position;
   a second buffer position in which the dose module is arrangement, the second buffer position corresponding to a second work position; and
   a third buffer position in which the overflow module is arrangeable, the third buffer position corresponding to a third work position.

8. The plant according to claim 1, wherein the at least one apparatus comprises at least two work positions arranged on opposite sides of the at least one tunnel structure.

9. The plant according to claim 7, wherein the at least one apparatus comprises first, second, and third work positions arranged on both sides of the at least one tunnel structure.

10. The plant according to claim 1, wherein the powder module further comprises a build module.

11. The plant according to claim 1, wherein the at least one powder module is moveable into the at least one apparatus via the at least one tunnel structure and out of the apparatus through an opening in the apparatus.

12. The plant according to claim 1, wherein the at least one powder module is moveable into the at least one apparatus through an opening in the apparatus and out of the apparatus via the at least one tunnel structure.

13. The plant according to claim 1, wherein the plant is adapted to individually load the at least one powder module into the at least one tunnel structure or into the at least one apparatus dependent on at least one of:
a type of the at least one powder module;
a type of at least one vacant work position; or a type of at least one vacant buffer position.

14. The plant according to claim 1, wherein the plant is adapted to load the at least one tunnel structure with at least two powder modules in a predefined order.

15. The plant according to claim 1, wherein at least one first buffer region is arranged in advance to the at least one tunnel structure of the at least one apparatus and at least one second buffer region is arranged behind the at least one apparatus with respect to the loading direction.

16. The plant according to claim 15, wherein at least one mobile transfer unit is adapted to transfer the at least one powder module between a pre-processing station and the at least one tunnel structure or the first buffer region and/or between the at least one apparatus or the second buffer region and a post-processing station.

17. The plant according to claim 1, wherein at least one first buffer region is arranged in advance to the at least one apparatus and at least one second buffer region is arranged behind the at least one tunnel structure with respect to the loading direction.

18. The plant according to claim 17, wherein at least one mobile transfer unit is adapted to transfer the at least one powder module between a pre-processing station and the at least one apparatus or the first buffer region and/or between the at least one tunnel structure or the second buffer region and a post-processing station.

19. The plant according to claim 4, wherein the at least one powder module is arranged or arrangeable in a buffer position of the at least one buffer position inside the at least one tunnel structure.

20. An apparatus for additively manufacturing three-dimensional objects by successive layerwise selective irradiation and consolidation of layers of a build material with an energy source, wherein at least one powder module is separably connected or connectable with the apparatus, the apparatus comprising:
at least one tunnel structure through which the at least one powder module is moveable in a tunnel transport direction, wherein the at least one powder module is moveable:
from the at least one tunnel structure into a work position into the apparatus along a loading direction and from the work position out of the apparatus along an unloading direction; or
from outside the apparatus into the work position along the loading direction and from the work position into the at least one tunnel structure along the unloading direction;
wherein the loading and unloading direction differ from the tunnel transport direction and wherein the at least one tunnel structure is arranged inside the apparatus, and wherein the at least one powder module comprises at least one of a dose module or an overflow module.

* * * * *